(12) United States Patent
Walker et al.

(10) Patent No.: US 11,167,507 B2
(45) Date of Patent: Nov. 9, 2021

(54) METHOD FOR MANUFACTURING A WIND TURBINE ROTOR BLADE ROOT ASSEMBLY

(71) Applicant: General Electric Company, Schenectady, NY (US)

(72) Inventors: Alan M. Walker, Simpsonville, SC (US); Andrew Mitchell Rodwell, Greenville, SC (US); David Patrick Cripps, Sandown (GB); James Paul Davidson, Greer, SC (US); Miguel Cabrera Lange, Simpsonville, SC (US); Nicholas Michael Seruntine, Slidell, LA (US)

(73) Assignee: General Electric Company, Schenectady, NY (US)

( * ) Notice: Subject to any disclaimer, the term of this patent is extended or adjusted under 35 U.S.C. 154(b) by 715 days.

(21) Appl. No.: 15/923,043

(22) Filed: Mar. 16, 2018

(65) Prior Publication Data

US 2019/0283347 A1 Sep. 19, 2019

(51) Int. Cl.
| | |
|---|---|
| *B29C 70/48* | (2006.01) |
| *F03D 1/06* | (2006.01) |
| *B29C 70/54* | (2006.01) |
| *B29C 70/76* | (2006.01) |
| *B29C 70/86* | (2006.01) |
| *B29D 99/00* | (2010.01) |

(52) U.S. Cl.
CPC ............ *B29C 70/48* (2013.01); *B29C 70/443* (2013.01); *B29C 70/547* (2013.01); *B29C 70/76* (2013.01);
(Continued)

(58) Field of Classification Search
CPC ....... B29C 70/48; B29C 70/86; B29C 70/443; B29C 70/76; B29C 70/547;
(Continued)

(56) References Cited

U.S. PATENT DOCUMENTS

| 8,172,538 B2 | 5/2012 | Hancock et al. |
| 8,347,501 B2 | 1/2013 | Petersen et al. |

(Continued)

FOREIGN PATENT DOCUMENTS

| CN | 101413479 A | 4/2009 |
| CN | 102220936 A | 10/2011 |

(Continued)

OTHER PUBLICATIONS

PCT Search Report and Written Opinion, dated Jun. 26, 2019.

*Primary Examiner* — Robert J Grunz
(74) *Attorney, Agent, or Firm* — Dority & Manning, P.A.

(57) ABSTRACT

A method for manufacturing a rotor blade root assembly includes placing outer skin layer(s) onto a blade mold and arranging a root plate with a plurality of through holes adjacent to an end face of the blade mold. The method also includes placing a plurality of root inserts atop the outer skin layer(s) and abutting against the root plate, with each of the root inserts defining a fastener hole. The method also includes inserting a root fastener into each of the aligned through holes and longitudinal fastener holes. Moreover, the method includes placing inner skin layer(s) atop the root inserts. Further, the root plate may include at least one fluid hole configured therethrough to provide a non-gas tight root plate. Alternatively, at least one seal may be arranged between the root plate and the blade mold that forms a non-gas tight connection with either or both of the root plate or the blade mold during a vacuum infusion process. Thus, the method includes securing the outer skin layer(s), the root inserts, the inner skin layer(s), and the root fasteners together to form the root assembly via the vacuum infusion process.

14 Claims, 11 Drawing Sheets

(51) Int. Cl.
  *B29C 70/44* (2006.01)
  *B29L 31/08* (2006.01)
  *F01D 5/18* (2006.01)

(52) U.S. Cl.
  CPC .......... *B29C 70/86* (2013.01); *B29D 99/0028* (2013.01); *F03D 1/0658* (2013.01); *F03D 1/0675* (2013.01); *B29L 2031/085* (2013.01); *F01D 5/18* (2013.01); *F05B 2230/23* (2013.01)

(58) Field of Classification Search
  CPC . B29D 99/0028; F03D 1/0658; F03D 1/0675; F01D 5/18; F05B 2230/23; B29L 2031/085; Y02P 70/50; Y02E 10/72
  See application file for complete search history.

(56) References Cited

U.S. PATENT DOCUMENTS

| | | | |
|---|---|---|---|
| 8,727,731 B2 | 5/2014 | Bendel et al. | |
| 9,132,590 B2 | 9/2015 | Frydendal et al. | |
| 9,539,759 B2 | 1/2017 | De Waal Malefijt et al. | |
| 2015/0056081 A1 | 2/2015 | De Waal Malefijt | |
| 2016/0003215 A1 | 1/2016 | Kratmann et al. | |
| 2016/0176127 A1 | 6/2016 | Borsting et al. | |

FOREIGN PATENT DOCUMENTS

| | | |
|---|---|---|
| CN | 103061995 A | 4/2013 |
| CN | 203019567 U | 6/2013 |
| CN | 203783821 U | 8/2014 |
| CN | 104110352 A | 10/2014 |
| CN | 204109193 U | 1/2015 |
| CN | 204449947 U | 7/2015 |
| CN | 105269717 A | 1/2016 |
| CN | 103692660 B | 2/2016 |
| CN | 105459417 A | 4/2016 |
| CN | 205271786 U | 6/2016 |
| CN | 105773879 A | 7/2016 |
| CN | 106121935 A | 11/2016 |
| CN | 104589093 B | 1/2017 |
| EP | 3 121 441 A1 | 1/1917 |
| EP | 2623769 A1 | 8/2013 |
| WO | WO 2013/113962 A1 | 8/2013 |

METHOD FOR MANUFACTURING A WIND TURBINE ROTOR BLADE ROOT ASSEMBLY

FIELD

The present subject matter relates generally to wind turbines and, more particularly, to methods for manufacturing wind turbine rotor blade root assemblies.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor is coupled to the nacelle and includes a rotatable hub having one or more rotor blades. The rotor blades are connected to the hub by a blade root. The rotor blades capture kinetic energy from wind using known airfoil principles and convert the kinetic energy into mechanical energy through rotational energy to turn a shaft coupling the rotor blades to a gearbox, or if a gearbox is not used, directly to the generator. The generator then converts the mechanical energy to electrical energy that may be deployed to a utility grid.

The particular size of the rotor blades is a significant factor contributing to the overall capacity of the wind turbine. Specifically, increases in the length or span of a rotor blade may generally lead to an overall increase in the energy production of a wind turbine. Accordingly, efforts to increase the size of rotor blades aid in the continuing growth of wind turbine technology and the adoption of wind energy as an alternative and commercially competitive energy source. Such increases in rotor blade size, however, may impose increased loads on various wind turbine components. For example, larger rotor blades may experience increased stresses at the connection between the blade root and the hub, leading to challenging design constraints, both characterized by extreme events and fatigue life requirements.

Modern methods for manufacturing rotor blades, particularly the blade root region of the rotor blade, include curing a plurality of root bolts into the blade root during a vacuum infusion process. More specifically, the root bolts can be placed between the inner and outer skin layers of the blade root and cured directly therebetween with a resin material during the infusion process. Thus, such a process eliminates machining of the blade root after the part has cured to accommodate the root bolts.

During the infusion process, however, it is important to properly locate and maintain the location of each of the root bolts such that the blade root can be easily attached to the hub of the wind turbine. In addition, a composite infused part often has limited access to the vacuum from one side of the part, thus limiting the flow of the resin to all areas of the part. The lack of vacuum pressure differential to drive the flow of resin to all areas of the part can lead to under infused areas of the composite, thereby causing detrimental defects within the final part.

Thus, there is a need for improved methods for manufacturing rotor blade roots that address the aforementioned issues. Accordingly, the present disclosure is directed to methods for manufacturing rotor blade roots that provide an additional vacuum path along the mold side of the part to improve infusion results.

BRIEF DESCRIPTION

Aspects and advantages of the invention will be set forth in part in the following description, or may be obvious from the description, or may be learned through practice of the invention.

In one aspect, the present disclosure is directed to a method for manufacturing a root assembly of a rotor blade of a wind turbine. The method includes placing one or more outer skin layers onto a blade mold. Further, the method includes arranging a root plate adjacent to an end face of the blade mold. The root plate includes at least one fluid hole configured therethrough to provide a non-gas tight root plate. In addition, the root plate includes a plurality of through holes. The method also includes placing a plurality of root inserts atop the one or more outer skin layers and abutting against the root plate. The plurality of root inserts each define a longitudinal fastener hole. As such, the longitudinal fastener holes of the plurality of root inserts align with the plurality of through holes of the root plate. Moreover, the method includes placing one or more inner skin layers atop the plurality of root inserts. The method also includes inserting a root fastener into each of the aligned through holes and longitudinal fastener holes. In addition, the method includes securing the one or more outer skin layers, the plurality of root inserts, the one or more inner skin layers, and the root fasteners together to form the root assembly via the vacuum infusion process.

In one embodiment, a center point of the at least one fluid hole is offset from a center point of a lower-most through hole of the plurality of through holes. In another embodiment, the root plate may further include a plurality of additional fluid holes arranged circumferentially therein for allowing at least one of gas or resin material to pass therethrough during infusion.

In further embodiments, the fluid hole(s) may be located on a lower half of the root plate. In additional embodiments, the fluid hole(s) may be located at least partially between two of the plurality of through holes.

In several embodiments, the vacuum infusion process may include placing a first vacuum bag atop the one or more inner skin layers, removing air between the blade mold and the first vacuum bag, and infusing a resin material into the first vacuum bag.

In particular embodiments, the method may further include creating an external vacuum with the fluid hole in the root plate by placing the first vacuum bag or the second vacuum bag atop an outlet of the fluid hole, removing air from the first vacuum bag or the second vacuum bag, and infusing a resin material into the first vacuum bag or the second vacuum bag.

In yet another embodiment, the method may include placing a membrane over at least one of an inlet or the outlet of the fluid hole in the root plate. Thus, the membrane is configured to allow gas to flow therethrough but preventing the resin material from flowing therethrough. In further embodiments, the method may also include sealing off the root fasteners from the resin material during the infusing step.

In another aspect, the present disclosure is directed to a system for manufacturing a root assembly of a rotor blade of a wind turbine. The system includes at least one blade mold for receiving one or more outer skins, a plurality of root inserts, one or more inner skin layers, and a plurality of root fasteners. In addition, the method includes a root plate for positioning a plurality of root fasteners circumferentially around the root assembly. The root plate includes a plurality of through holes that align with the longitudinal fastener holes of the plurality of root inserts of the root assembly. The aligned through holes and fastener holes are configured to receive the plurality of root fasteners. The system also includes at least one seal arranged between the root plate and the blade mold that forms a non-gas tight connection with at least one of the root plate or the blade mold during a vacuum infusion process. The system also includes a vacuum infusion system for securing the one or more outer skins, the plurality of root inserts, the one or more inner skin layers, and the plurality of root fasteners together via a resin material to form the root assembly.

It should be understood that the system may further include any of the additional features as described herein. For example, in one embodiment, the seal may include a fluid opening or may be formed of a breathable material. More specifically, the breathable material as described herein is permeable to vapor but not resin.

In another aspect, the present disclosure is directed to a system for manufacturing a root assembly of a rotor blade of a wind turbine. The system includes at least one blade mold for receiving one or more outer skins, a plurality of root inserts, one or more inner skin layers, and a plurality of root fasteners. The system also includes at least one non-gas tight feature that permits gas flow therethrough during a vacuum infusion process and a vacuum infusion system for securing the one or more outer skins, the plurality of root inserts, the one or more inner skin layers, and the plurality of root fasteners together via a resin material to form the root assembly.

In one embodiment, the non-gas tight feature may include at least one fluid hole configured through the root plate. Alternatively, the non-gas tight feature may include at least one opening configured through a seal arranged between the root plate and the blade mold. In addition, it should be understood that the system may further include any of the additional features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to improved methods for manufacturing wind turbine rotor blades that utilizes a root plate, a plurality of root inserts each defining a fastener hole, and a non-gas tight feature. In one embodiment, for example, the non-gas tight feature may be created via an additional vacuum port (also referred to herein as a fluid hole) in the root plate to create a non-gas tight root plate. Alternatively, the non-gas tight feature may be created via a non-gas tight connection of a seal between the root plate and the blade mold, e.g. by providing a hole or opening through the seal. As such, during infusion of the blade root, the additional vacuum port in the root plate and/or the hole in the seal improves resin flow by drawing gas and/or resin therethrough, thereby decreasing potential manufacturing defects in the infused part and more effectively drawing the resin below the root inserts.

As used herein, the term "non-gas tight" generally refers to deliberately enabling gas flow to pass through, for example, by providing a hole, leak, or similar in one or more components of the system. Thus, the pressure drop across the non-gas tight feature (e.g. the root plate or seal) is higher than that of a gas-tight feature. Though gas-tight systems may allow some level of gas to pass through certain components of the system, the overall goal of such systems is to minimize such flow. In contrast, the system of the present disclosure purposely increases the amount of gas flow allowed to pass through one or more components thereof for the benefit of drawing resin to an area that would otherwise be difficult to reach.

Figure 1:
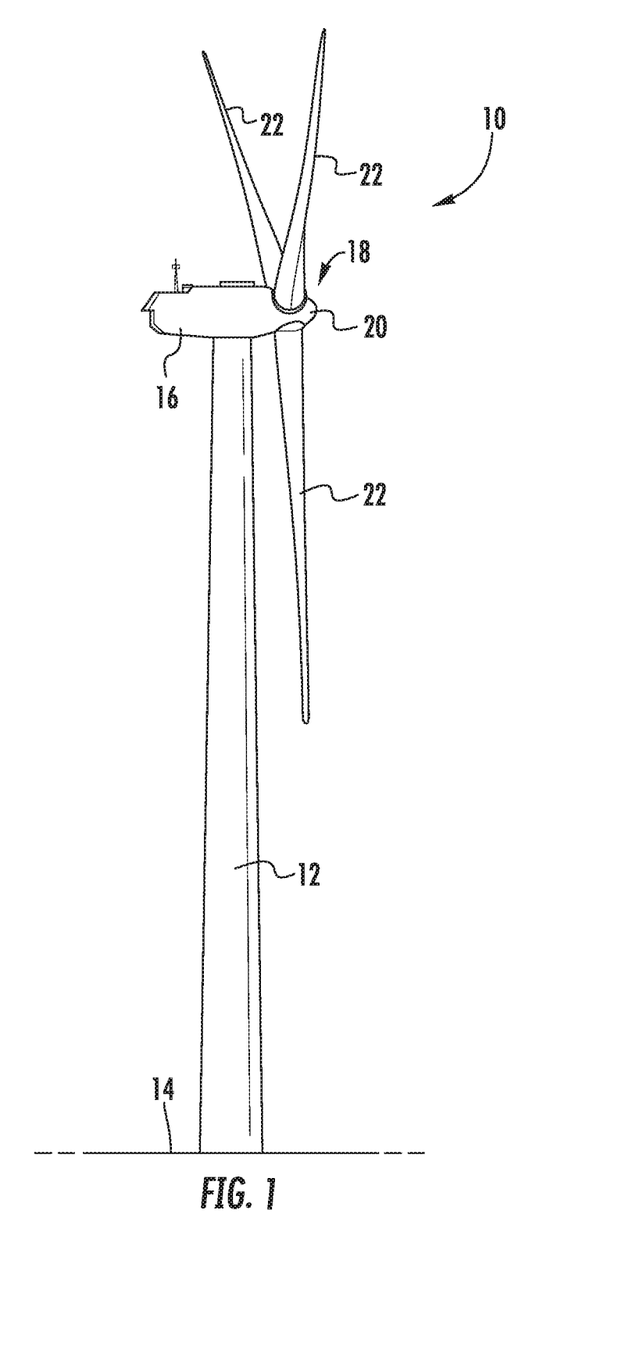
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. More specifically, as shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

Figure 2:
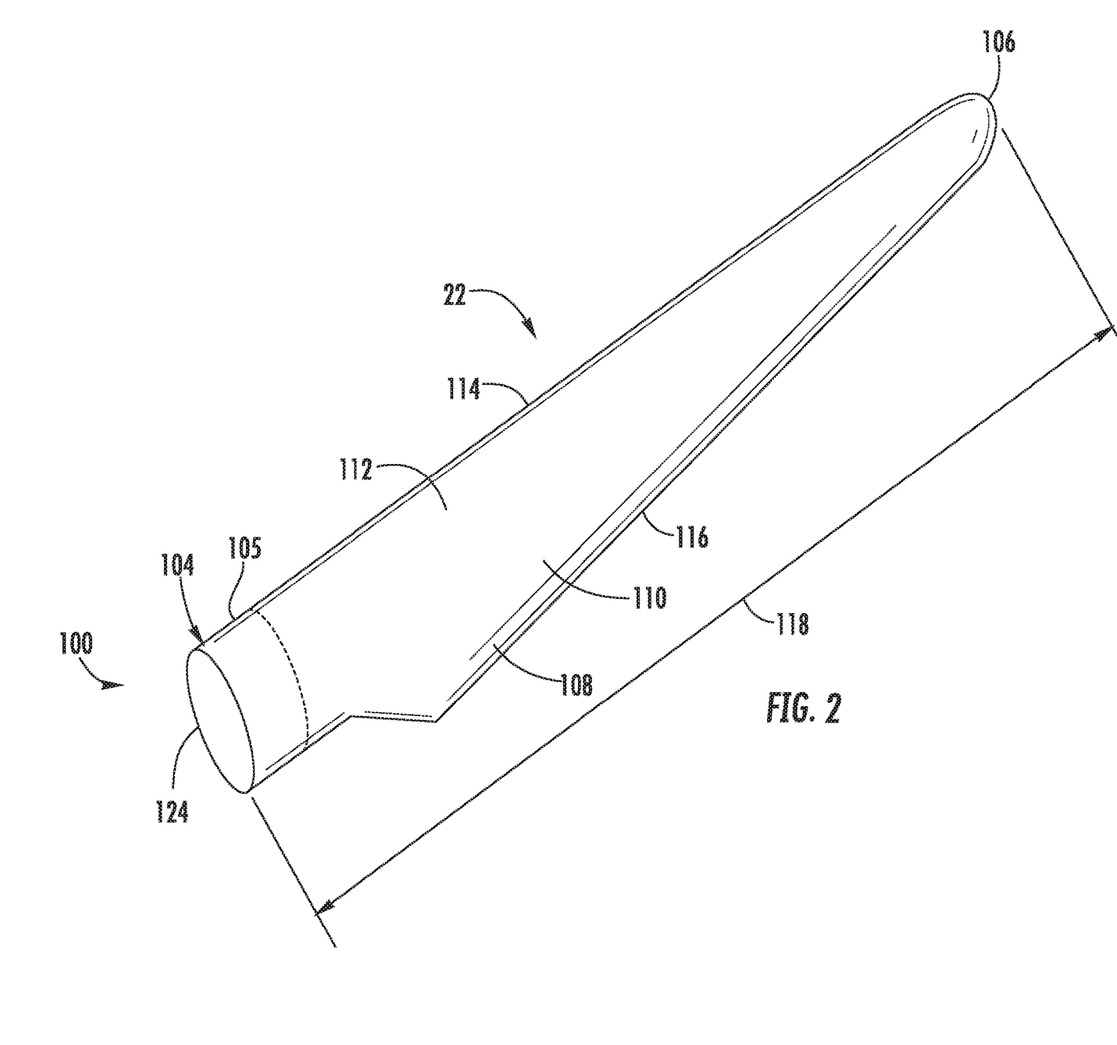
FIG. 2 illustrates a perspective view of one embodiment of a root assembly of a wind turbine according to the present disclosure.

Referring now to FIG. 2, there is illustrated one embodiment of a rotor blade 22 having a root assembly 100 according to the present invention. Further, as shown, the rotor blade 22 includes a body shell 108 defining a pressure side 110 and a suction side 112 extending between a leading edge 114 and a trailing edge 116. In addition, as shown, the body shell 108 may generally be configured to extend between a blade root 105 and a blade tip 106 disposed opposite the blade root 105 and may serve as the outer casing/covering of inner load bearing structure of the blade 22. Further, the rotor blade 22 may have a span 118 defining the total length between the blade root 105 and the blade tip 106. The root assembly 100 may further include a blade root section 104 having a generally cylindrical shape extending span-wise from the pressure side 110 and suction side 112 to an end face 124 of the blade root section 104. The term "span-wise" is generally understood to mean substantially parallel to the span 118 of the rotor blade 22. Thus, the end face 124 of the blade root section 104 may be configured to attach the rotor blade 22 to the hub 18 of the wind turbine 10 (FIG. 1).

Figure 3:
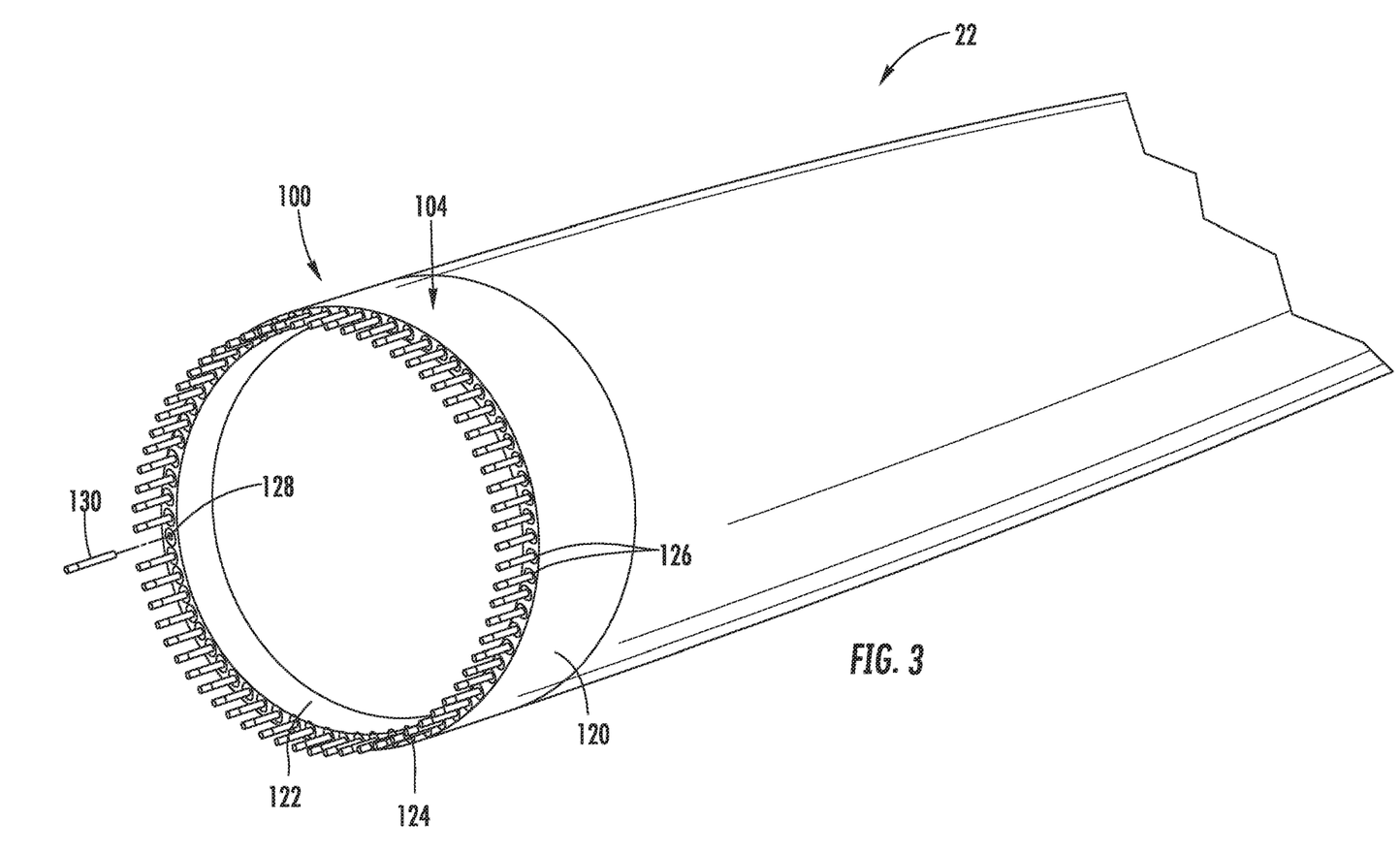
FIG. 3 illustrates an enlarged view of a portion of the root assembly of FIG. 2 according to the present disclosure.

Referring now to FIG. 3, an enlarged view of the root assembly 100 of FIG. 2 is illustrated. In this particular embodiment, the blade root section 104 includes end face 124 and has a substantially annular cross-section defined by an outer sidewall surface 120 and an inner sidewall surface 122. More specifically, a plurality of root inserts 126 are provided between the sidewall surfaces 120, 122 each defining a longitudinal fastener hole 128 extending from the end face 124 to a predetermined span-wise distance within the root assembly 100. Thus, as shown, a plurality of root fasteners 130 can be provided through the longitudinal fastener holes 128 of the root inserts 126.

Figure 4:
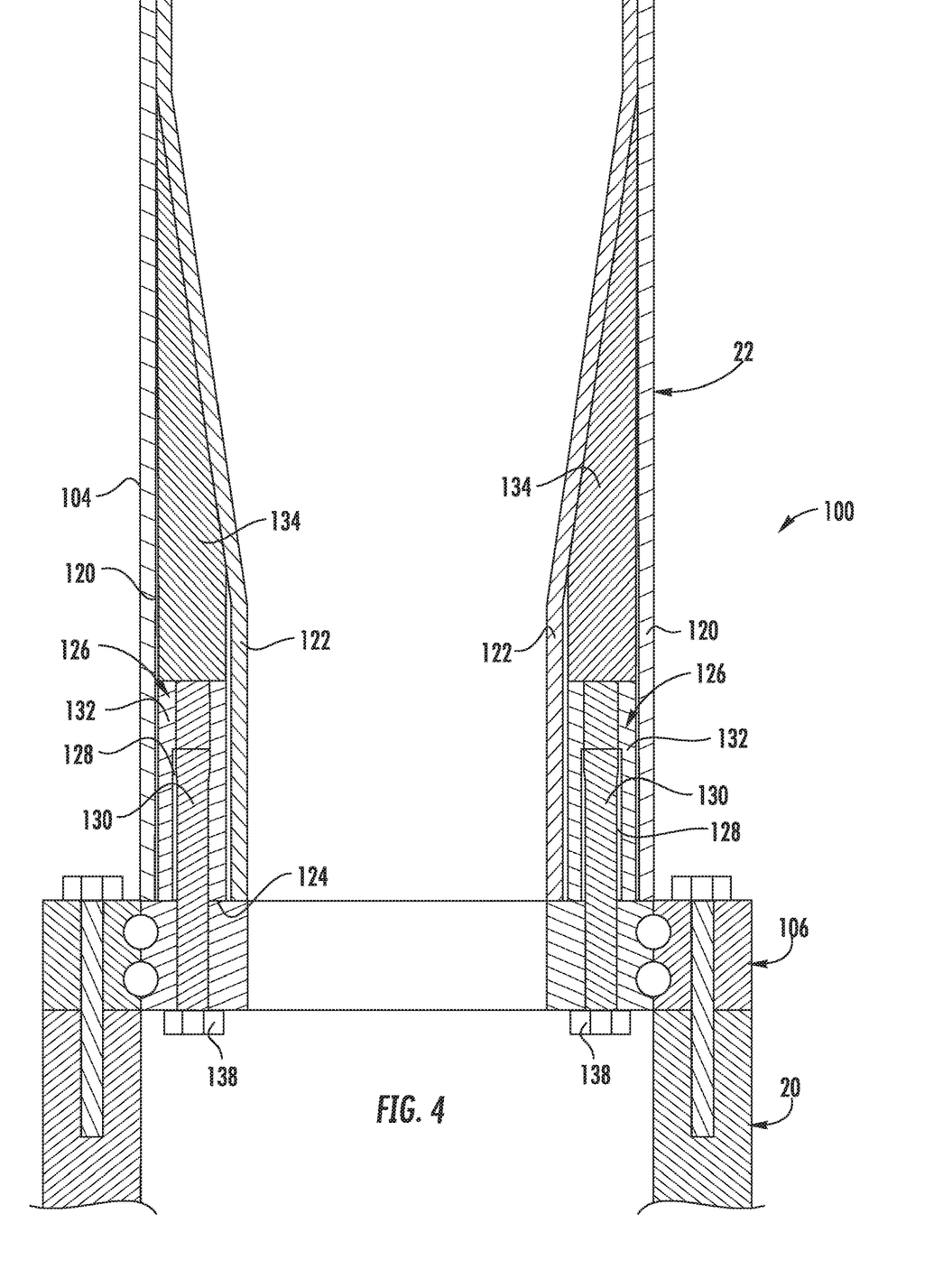
FIG. 4 illustrates a cross-sectional view of one embodiment of the root assembly according to the present disclosure.

Referring now to FIG. 4, a cross-sectional view of one embodiment of the root assembly 100 connected to the hub 20 according to the present disclosure is illustrated. More specifically, as shown, the blade root section 104 is connected to a hub 20 with the root fasteners 130 through a pitch bearing 106. Further, as shown, the blade root section 104 includes inner 122 and outer 120 sidewall surfaces, wherein the root fasteners 130 are circumferentially spaced (equally or otherwise) between the inner 122 and the outer 120 sidewall surfaces. Moreover, as shown, the plurality of root inserts 126 are provided between the sidewall surfaces 120, 122 and each define one of the longitudinal fastener holes 128. More specifically, as shown, the root inserts 126 may include a threaded portion 132 having internal threads for threading the root fasteners 130 thereto. Further, as shown, the root fasteners 130 may be secured within the longitudinal fastener holes 128 via nuts 138 which are configured to provide a predetermined preload to the root fasteners 130. In addition, the root assembly 100 may include a filler material 134 positioned to fill a gap between the inner 122 and the outer 120 sidewall surfaces adjacent to the root inserts 126.

Figure 5:
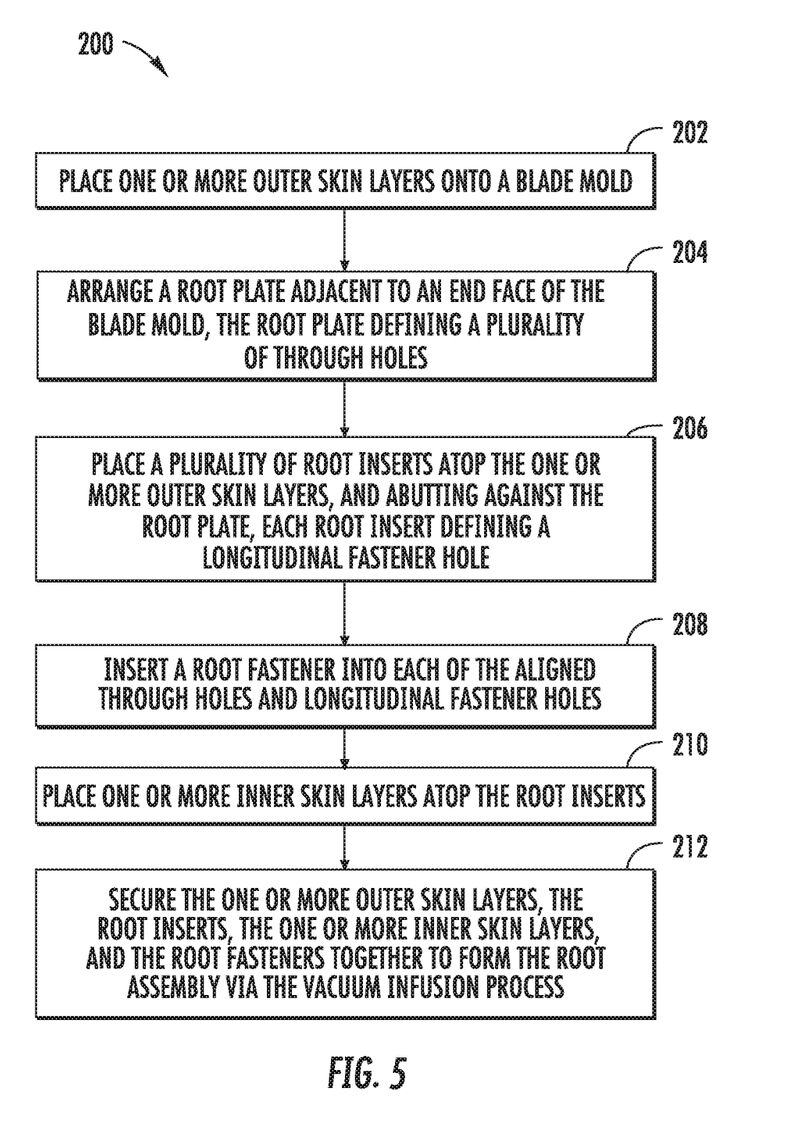
FIG. 5 illustrates a flow diagram of one embodiment of a method for manufacturing a root assembly of a rotor blade of a wind turbine according to the present disclosure.

Accordingly, the present disclosure is directed to systems and methods for manufacturing root assemblies for wind turbines, such as the root assembly 100 illustrated in FIGS. 3 and 4. Referring particularly to FIG. 5, a flow diagram of one embodiment of a method 200 for manufacturing the root assembly 100 according to the present disclosure is illustrated. Further, FIGS. 6-11 illustrate various embodiments of a system 140 for manufacturing the root assembly 100 according to the present disclosure.

Figure 7:
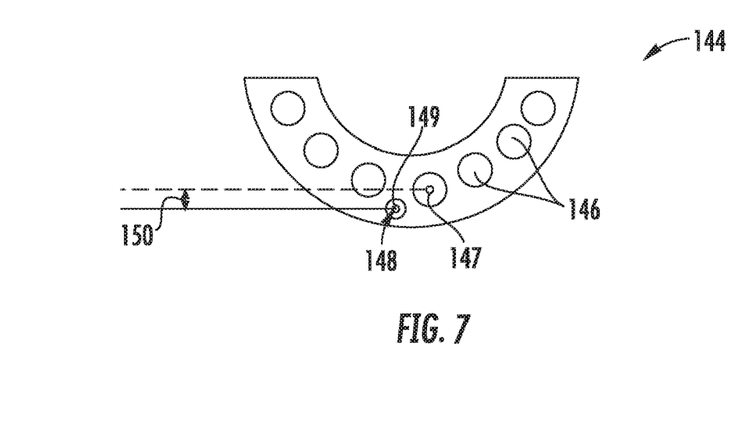
FIG. 7 illustrates a front view of one embodiment of a non-gas tight root plate of a system for manufacturing a root assembly according to the present disclosure.
Figures 8, 9:
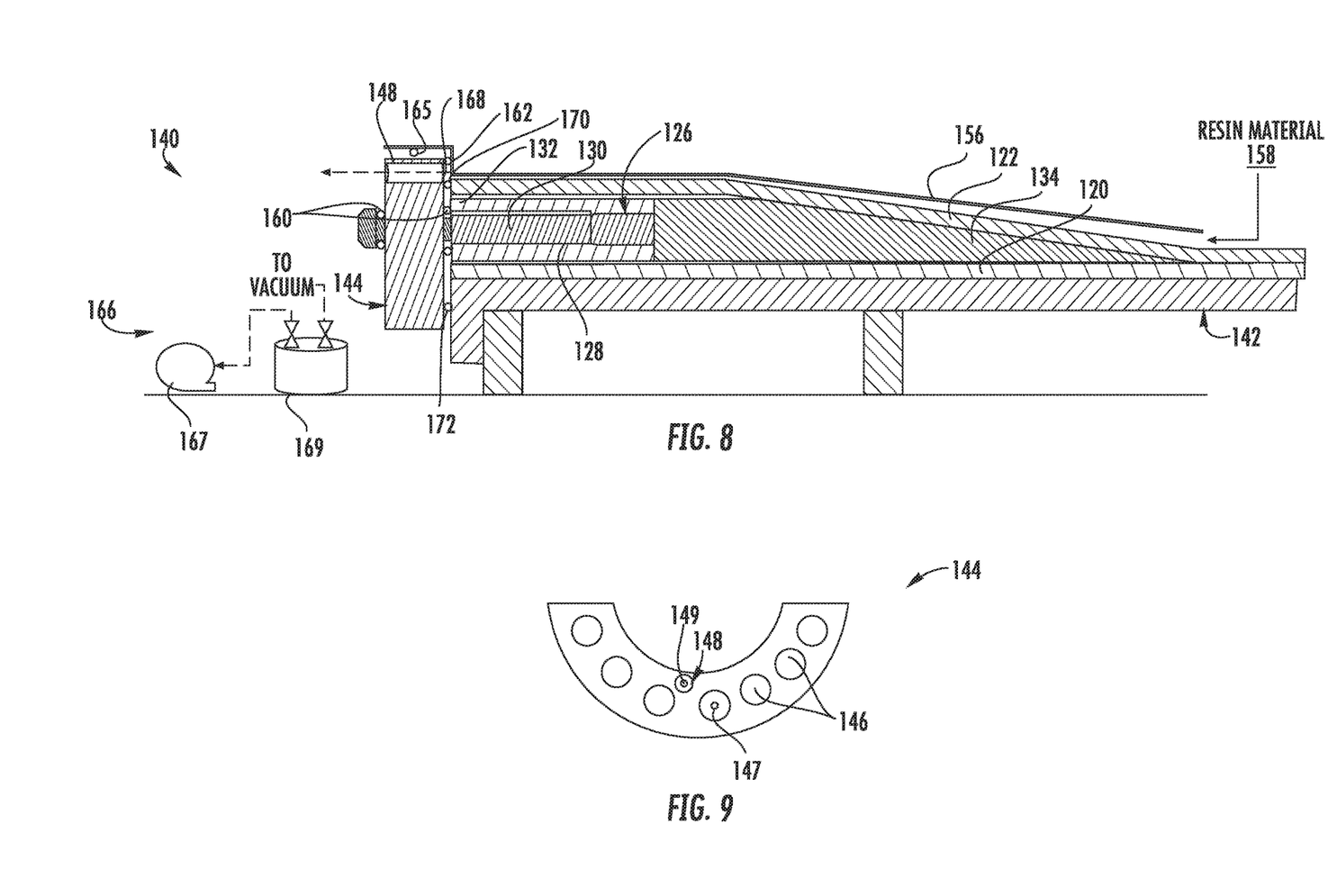
FIG. 8 illustrates a partial cross-sectional view of another embodiment of a system for manufacturing a root assembly according to the present disclosure.
FIG. 9 illustrates a front view of another embodiment of a non-gas tight root plate of a system for manufacturing a root assembly according to the present disclosure.
Figure 11:
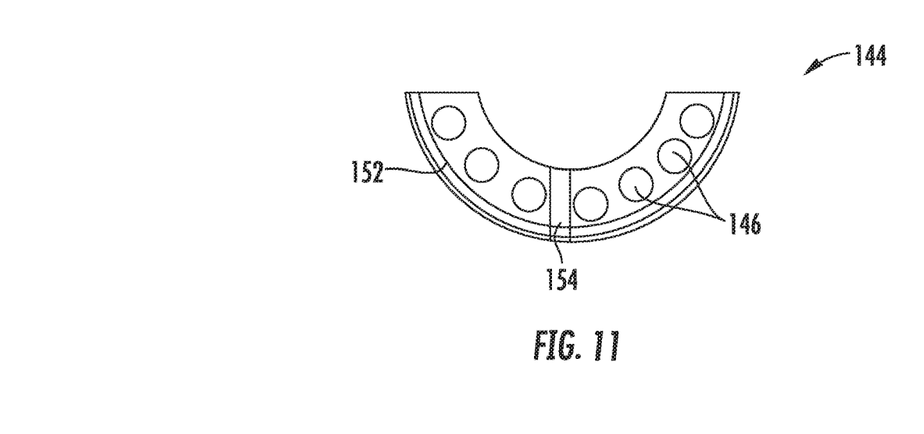
FIG. 11 illustrates a front view of still another embodiment of a system for manufacturing a root assembly according to the present disclosure, particularly illustrated a non-gas tight connection between a root plate and a mold of the system.

Referring particularly to FIG. 5, as shown at 202, the method 200 includes placing one or more outer skin layers 120 onto a blade mold 142. It should be understood that the outer skin layers 120 form the outer sidewall surface 120 of the final root assembly 100, therefore, reference character 120 is used to describe both terms. As shown at 204, the method 200 includes arranging a root plate 144 adjacent to an end face of the blade mold 142. For example, as shown in FIGS. 7, 9, and 11, the root plate 144 may have a generally arcuate or curved shape that corresponds to the shape or profile of the end face 124 of the root assembly 100. In addition, as shown, the root plate 144 includes a plurality of through holes 146 configured to align with longitudinal fastener holes 128 of the root inserts 126 to assist in properly locating and holding the root fasteners 130 in place during manufacturing of the root assembly 100.

Figure 6:
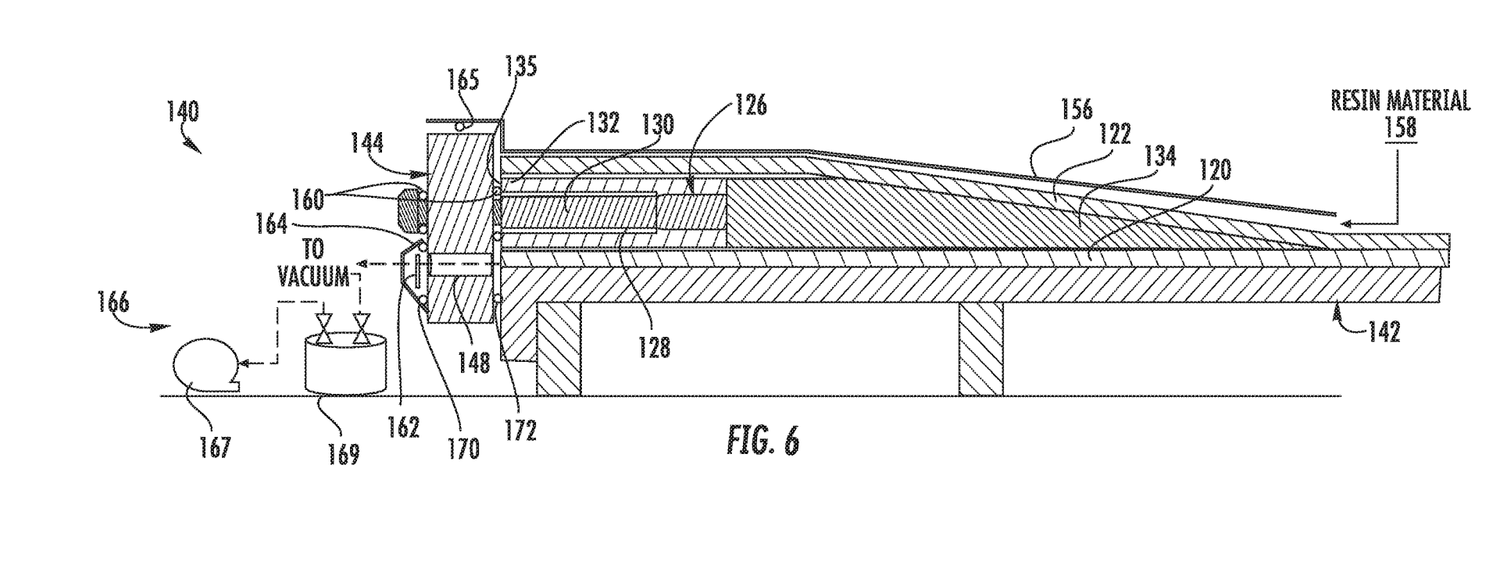
FIG. 6 illustrates a partial cross-sectional view of one embodiment of a system for manufacturing a root assembly according to the present disclosure.

In addition, as shown generally in FIGS. 6-9, the root plate 144 may be a non-gas tight plate that allows gas and/or a resin to pass through, facilitated by a vacuum pump. Thus, in one example, the non-gas tight plate may include any suitable non-gas tight feature, such as a hole, that provides improved resin flow during a vacuum infusion process. More specifically, as shown in FIGS. 6-9, the non-gas tight feature may correspond to at least one fluid hole 148 configured through the root plate 144. For example, as shown in FIGS. 6 and 7, the root plate 144 includes a single fluid hole 148. However, in additional embodiments, the root plate 144 may include a plurality of fluid holes 148 arranged circumferentially around the root plate 144 for allowing gas and/or resin material to pass therethrough during infusion.

Referring particularly to FIG. 7, the fluid hole(s) 148 in the root plate 144 may be located on a lower half of the root plate 144. In such embodiments, a center point 149 of the fluid hole(s) 148 may be offset from a center point 147 of a lower-most through hole of the plurality of through holes 146, e.g. as shown via offset 150. More specifically, as shown in FIG. 7, the center point 149 of the fluid hole(s) 148 may be located below the center point 147 of the lower-most through hole 146. Alternatively, as shown in FIG. 9, the center point 148 of the fluid hole(s) 148 may be located above the center point 147 of the lower-most through hole 146. Further, as shown in FIGS. 7, 9, and 11, the fluid hole(s) 148 may be located at least partially between two of the through holes 146.

Once the root plate 144 is properly positioned, as shown at 206 of FIG. 5, the method 200 includes placing the plurality of root inserts 126 atop the one or more outer skin layers 120 and abutting against the root plate 144. As mentioned and as shown particularly in FIGS. 6, 8, and 10, each of the root inserts 126 define one of the longitudinal fastener holes 128. As such, the longitudinal fastener holes 128 of the plurality of root inserts 126 align with the plurality of through holes 146 of the root plate 144. Accordingly, as shown at 208, the method 200 further includes inserting a root fastener 130 into each of the aligned through holes 146 and longitudinal fastener holes 128. Further, as shown at 210, the method 200 further includes placing one or more inner skin layers 122 atop the plurality of root inserts 126. Similarly, it should be understood that the inner skin layers 122 form the inner sidewall surface 122 of the final root assembly 100, therefore, reference character 122 is used to describe both terms.

Referring still to FIG. 5, as shown at 212, the method 200 includes securing the outer skin layer(s) 120, the root inserts 126, the inner skin layer(s) 122, and the root fasteners 130 together to form the root assembly 100 via the vacuum infusion process. For example, in one embodiment, the vacuum infusion process may include placing a first vacuum bag 156 atop the one or more inner skin layers 122, removing air between the blade mold 142 and the first vacuum bag 156, and infusing a resin material 158 into the first vacuum bag 156.

Figure 10:
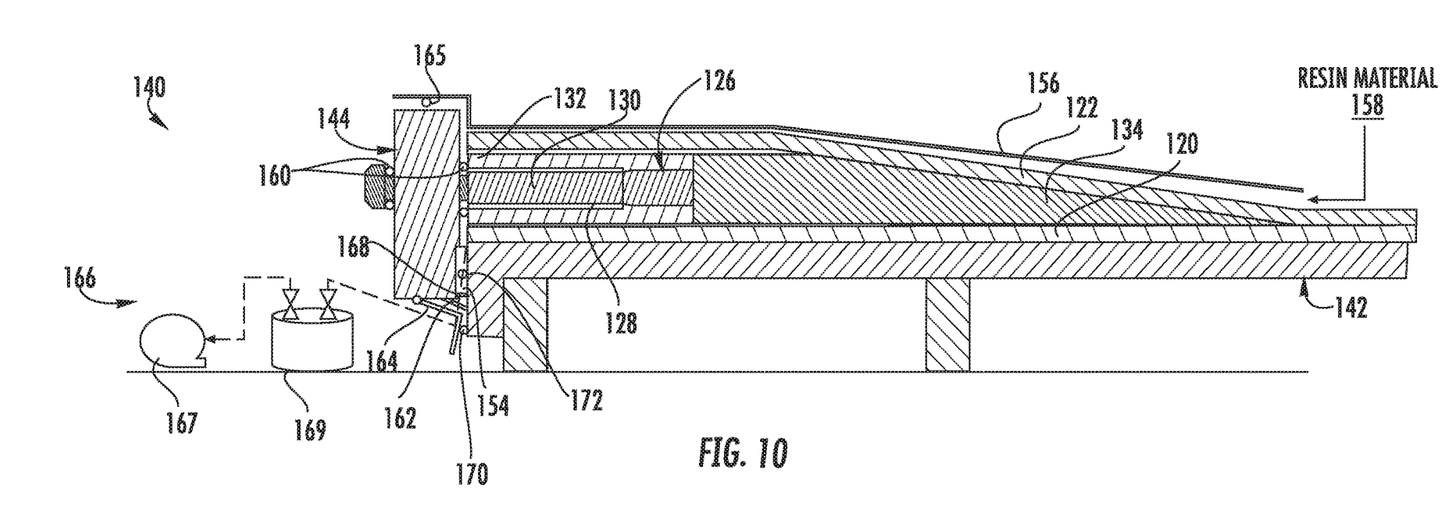
FIG. 10 illustrates a partial cross-sectional view of still another embodiment of a system for manufacturing a root assembly according to the present disclosure.

Referring now to FIGS. 10 and 11, in alternative embodiments, the system 140 may include a non-gas tight connection, rather than a non-gas tight root plate 144. For example, as shown in FIGS. 10 and 11, the non-gas tight connection may be provided via at least one opening 154 configured through a seal 172 arranged between the root plate 144 and the blade mold 142.

In additional embodiments, as shown in FIGS. 6, 8, and 10, the system 140 may also include an external vacuum system 166 for providing an external vacuum to the non-gas tight feature/connection. For example, as shown particularly in FIG. 10, the external vacuum may be created by placing vacuum bag 164 atop an outlet 168 of the non-gas tight feature/connection, e.g. the seal opening 154, removing air from the vacuum bag 164 (e.g. via a vacuum pump 167), infusing the resin material 158 into the vacuum bag 164, drawing the resin material 158 through the root assembly 100, wherein the resin material is also drawn towards the seal opening 154, and capturing any excess resin material 158 that flows through the seal opening 154 into a storage container 169.

Alternatively, as shown in FIGS. 6 and 10, the external vacuum may be created by placing a second vacuum bag 164 atop the outlet 168 of the fluid hole(s) 148 and/or the opening(s) 154, removing air from the second vacuum bag 164 (e.g. via the vacuum pump 167), infusing the resin material 158 into the second vacuum bag 164, drawing the resin material 158 through the root assembly 100 towards the fluid hole(s) 148 and/or the opening(s) 154, and capturing any excess resin material 158 that flows through the fluid hole(s) 148 and/or the opening(s) 154 into the storage container 169.

In addition, as shown in FIGS. 6, 8, and 10, the system 140 may also include at least one membrane 162 positioned at the inlet and/or outlet 168 of the fluid hole(s) 148 and/or the opening(s) 154, i.e. between the vacuum bags 156, 164 and the outlet 168. As such, the membrane(s) 162 is gas permeable (i.e. the membrane 162 allows gas to flow therethrough but prevents the resin material 158 from flowing therethrough).

Referring still to FIGS. 6. 8, and 10, the system 140 may include one or more additional seals 160, 165, 170, 172 for maintaining system-wide vacuum integrity. For example, as shown, one or more first seals 165 may be provided between the root plate 144 and the first vacuum bag 156. More specifically, in one embodiment, such seals 165 may correspond to a temporary mold sealant, such as tacky tape. In additional embodiments, as shown, the system 140 may also include one or more second seals 160 for sealing off the root fasteners 130 from the resin material 158 during the infusing step. For example, as shown, the second seals(s) 160 may correspond to O-seals that fit around the outer diameter of the root fasteners 130. As such, the second seals 160 are configured to prevent the resin material 158 from flowing into the longitudinal fastener holes 128 of the root inserts 126. In still another embodiment, the system 140 may include one or more third seals 170 at the outlet 168 of the fluid hole(s) 148 and/or the fluid opening(s) 154, e.g. between the membrane 162 and the respective vacuum bag 156, 164. As such, the third seals 170 are configured to assist in creating the external vacuum for the fluid hole(s) and/or opening(s) 148, 154. In addition, the system 140 may include one or more fourth seals 172 positioned between the root plate 144 and the blade mold 142. For example, in one embodiment, the fourth seals 172 may correspond to silicone beads, tacky tape, or similar. Thus, the seals 160, 165, 170, 172 described herein provide a sealed system, except for the fluid hole(s) 148 and/or opening(s) 154 that allow gas and/or resin to pass therethrough.

Figure 12:
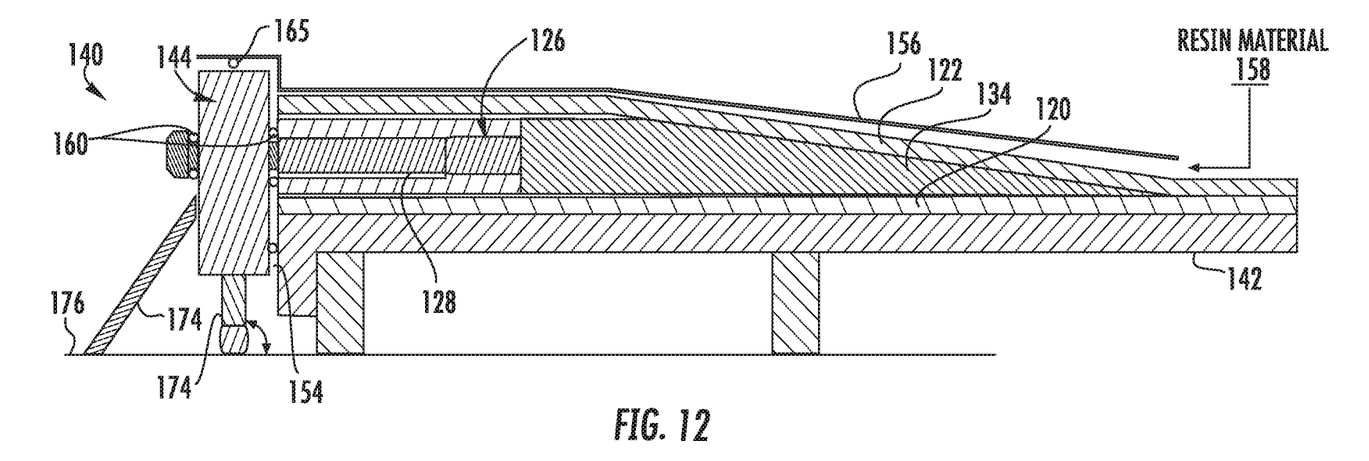
FIG. 12 illustrates a partial cross-sectional view of yet another embodiment of a system for manufacturing a root assembly according to the present disclosure, particularly illustrating the root plate secured to the ground.
Figure 13:
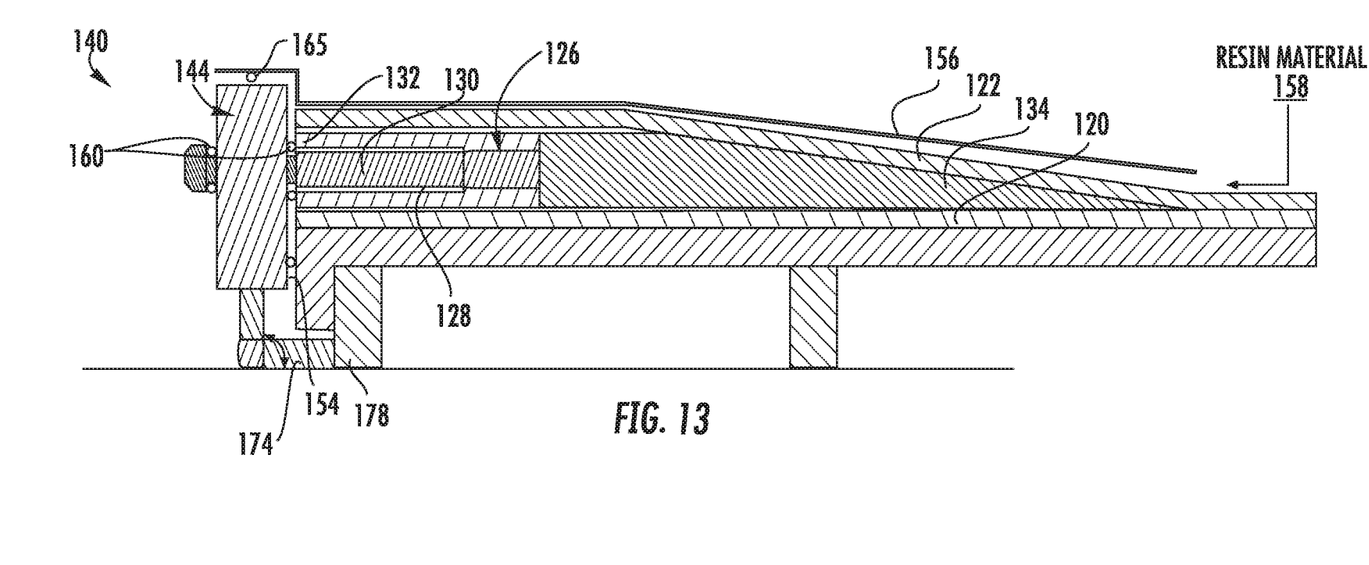
FIG. 13 illustrates a partial cross-sectional view of another embodiment of a system for manufacturing a root assembly according to the present disclosure, particularly illustrating the root plate secured to framework that supports the blade mold.

Referring now to FIGS. 12-16, various cross-sectional views of additional embodiments of the system 140 for manufacturing the root assembly 100 according to the present disclosure are illustrated. More specifically, as shown in FIG. 12, the root plate 144 is secured to the ground 176 via one or more supports 174. Thus, as shown, the root plate 144 is not secured to the blade mold 142. Therefore, in such embodiments, the support(s) 174 are configured to hinge into and out of position to provide pressure to the root plate 144. Similarly, as shown in FIG. 13, a partial cross-sectional view of another embodiment of the system 140 for manufacturing the root assembly 100 according to the present disclosure is illustrated. More specifically, as shown, the root plate 144 is secured to framework 178 that supports the blade mold 174 via the support(s) 174. Thus, like the embodiment of FIG. 12, the root plate 144 is not secured to the blade mold 142.

Figure 14:
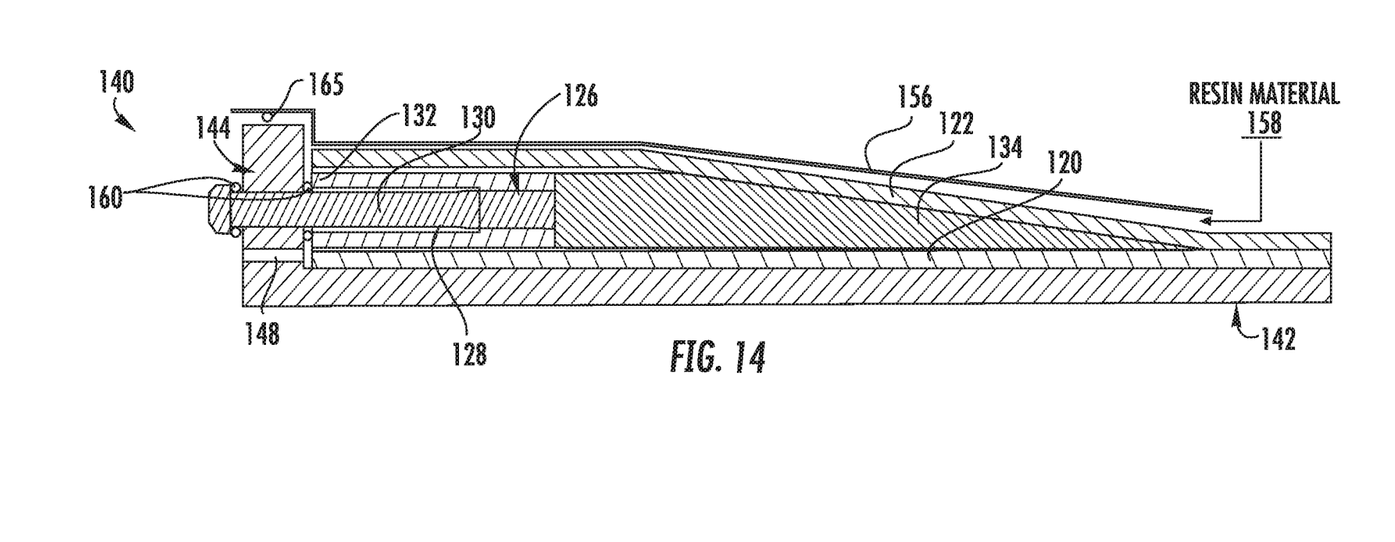
FIG. 14 illustrates a partial cross-sectional view of still another embodiment of a system for manufacturing a root assembly according to the present disclosure, particularly illustrating an L-shaped blade mold.

In alternative embodiments, as shown in FIG. 14, the root plate 144 may be eliminated. In such embodiments, as shown, the blade mold 142 may have an L-shape such that the blade mold 142 is configured to operate similar to the root plate 144 described herein. Thus, as shown, the blade mold 142 may include at least one fluid hole 148 to provide a non-gas tight feature.

Figure 15:
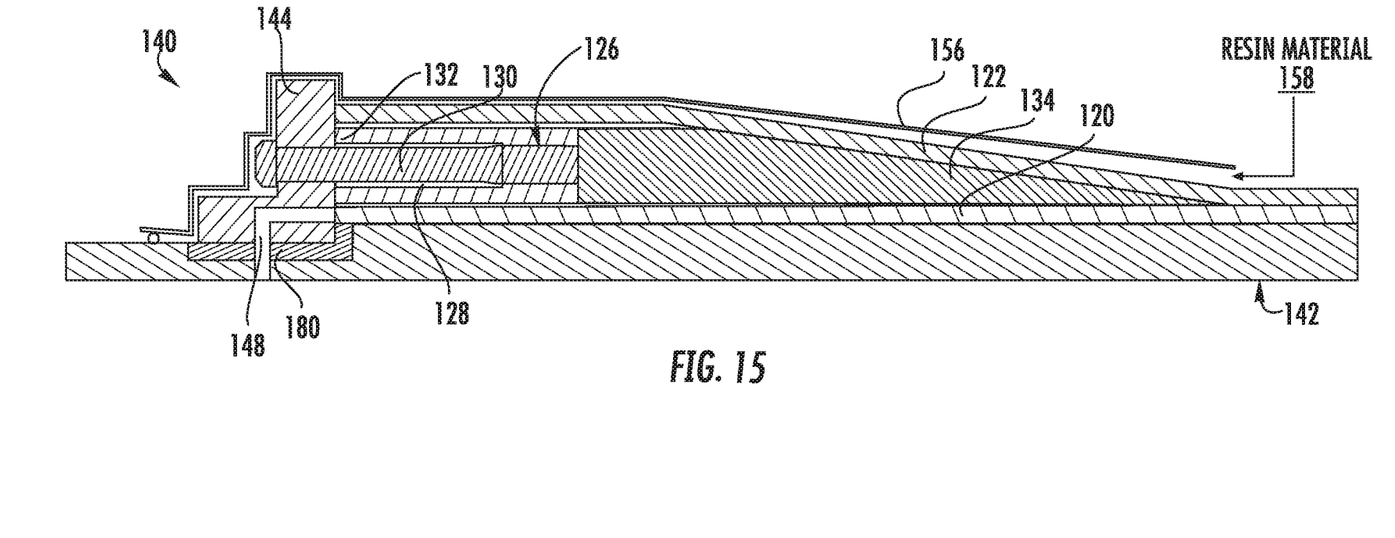
FIG. 15 illustrates a partial cross-sectional view of a further another embodiment of a system for manufacturing a root assembly according to the present disclosure, particularly illustrating an L-shaped root plate that sits atop the blade mold.
Figure 16:
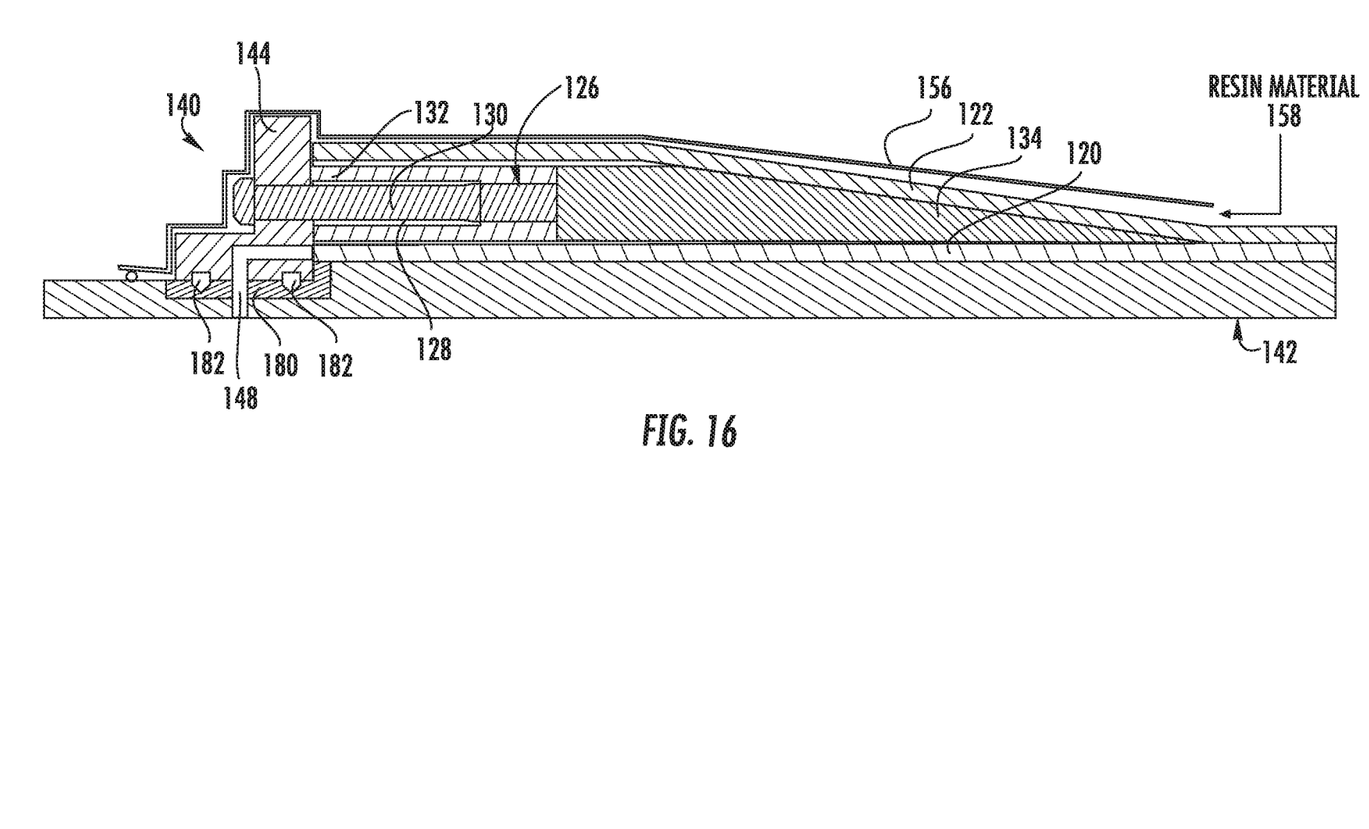
FIG. 16 illustrates a partial cross-sectional view of an additional embodiment of a system for manufacturing a root assembly according to the present disclosure, particularly illustrating an L-shaped root plate that sits atop the blade mold and is secured to the blade mold via a plurality of dowel pins.

Referring now to FIGS. 15 and 16, still further embodiments of the system 140 for manufacturing the root assembly 100 according to the present disclosure are illustrated. As shown particularly in FIG. 15, the root plate 144 has an L-shape such that the plate 144 sits atop the blade mold 142. In addition, as shown, the root assembly 100 may include an insert 180 arranged between the blade mold 142 and the root plate 144. As such, the insert 180 is configured to position the root plate 144 atop the blade mold 142. More specifically, in certain embodiments, the insert 180 may be constructed of a metallic material. In further embodiments, as shown in FIG. 16, the root plate 144 may be secured to the blade mold 142 via one or more dowel pins 182. In addition, as shown, the illustrated system 140 includes at least one fluid hole 148 configured through the L-shaped root plate 44, the insert 180, and the blade mold 142 to provide a non-gas tight connection.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a root assembly of a rotor blade of a wind turbine, the method comprising:
   placing one or more outer skin layers onto a blade mold;
   arranging a root plate adjacent to an end face of the blade mold, the root plate comprising at least one fluid hole configured therethrough to provide a non-gas tight root plate, the root plate comprising a plurality of through holes in addition to the at least one fluid hole;
   placing a plurality of root inserts atop the one or more outer skin layers and abutting against the root plate, the plurality of root inserts each defining a longitudinal fastener hole, the longitudinal fastener holes of the plurality of root inserts aligning with the plurality of through holes of the root plate;
   inserting a root fastener into each of the aligned through holes and longitudinal fastener holes with the at least one fluid hole being absent of a root fastener;
   placing one or more inner skin layers atop the plurality of root inserts; and,
   securing the one or more outer skin layers, the plurality of root inserts, the one or more inner skin layers, and the root fasteners together to form the root assembly via the vacuum infusion process.

2. The method of claim 1, wherein a center point of the at least one fluid hole is below a center point of a lower-most through hole of the plurality of through holes.

3. The method of claim 1, wherein the root plate further comprises a plurality of additional fluid holes arranged circumferentially therein for allowing at least one of gas or resin material to pass therethrough during infusion.

4. The method of claim 1, wherein the at least one fluid hole is located on a lower half of the root plate.

5. The method of claim 1, wherein the at least one fluid hole is located at least partially between two of the plurality of through holes.

6. The method of claim 1, wherein the vacuum infusion process further comprises:

placing a first vacuum bag atop the one or more inner skin layers;
removing air between the blade mold and the first vacuum bag; and,
infusing a resin material into the first vacuum bag.

7. The method of claim 6, further comprising creating an external vacuum with the fluid hole in the root plate, wherein creating the external vacuum further comprises:
   placing the first vacuum bag or the second vacuum bag atop an outlet of the at least one fluid hole of the non-gas tight root plate;
   removing air from the first vacuum bag or the second vacuum bag; and,
   infusing a resin material into the first vacuum bag or the second vacuum bag.

8. The method of claim 7, further comprising placing a membrane over at least one of an inlet or the outlet of the fluid hole in the root plate, the membrane configured to allow gas to flow therethrough but preventing the resin material from flowing therethrough.

9. The method of claim 1, further comprising sealing off the root fasteners from the resin material during the infusing step.

10. The method of claim 1, wherein the plurality of through holes are arranged circumferentially about the root plate along a common arc, and wherein the at least one fluid hole is offset from the common arc.

11. A system for manufacturing a root assembly of a rotor blade of a wind turbine, the system comprising:
   at least one blade mold for receiving one or more outer skins, a plurality of root inserts, one or more inner skin layers, and a plurality of root fasteners;
   a root plate configured for arranging adjacent to an end face of the blade mold, the root plate comprising at least one fluid hole configured therethrough to provide a non-gas tight root plate, the root plate comprising a plurality of through holes in addition to the at least one fluid hole, the plurality of through holes for receiving the plurality of root fasteners and being arranged circumferentially about the root plate along a common arc, the at least one fluid hole being offset from the common arc, the at least one fluid hole permitting gas flow therethrough during a vacuum infusion process; and,
   a vacuum infusion system for securing the one or more outer skins, the plurality of root inserts, the one or more inner skin layers, and the plurality of root fasteners together via a resin material to form the root assembly.

12. The system of claim 11, wherein the root plate further comprises a plurality of additional fluid holes arranged circumferentially therein for allowing at least one of gas or resin material to pass therethrough during infusion.

13. The system of claim 11, further comprising at least one membrane positioned over at least one of an inlet or an outlet of the at least one fluid hole, the membrane configured to allow gas to flow therethrough but preventing the resin material from flowing therethrough.

14. The system of claim 11, wherein the blade mold is L-shaped, the blade mold comprising a plurality of through holes that align with a plurality of longitudinal fastener holes of the plurality of root inserts of the root assembly, the aligned through holes and fastener holes configured to receive the plurality of root fasteners.

* * * * *